(12) United States Patent
Rabben et al.

(10) Patent No.: US 7,990,378 B2
(45) Date of Patent: Aug. 2, 2011

(54) METHODS AND APPARATUS FOR VOLUME RENDERING

(75) Inventors: Stein Inge Rabben, Sofiemyr (NO); Sevald Berg, Horten (NO); Erik Normann Steen, Moss (NO)

(73) Assignee: General Electric Company, Schenectady, NY (US)

( * ) Notice: Subject to any disclaimer, the term of this patent is extended or adjusted under 35 U.S.C. 154(b) by 1119 days.

(21) Appl. No.: 11/800,742

(22) Filed: May 7, 2007

(65) Prior Publication Data

US 2008/0278488 A1 Nov. 13, 2008

(51) Int. Cl.
*G06T 17/00* (2006.01)
(52) U.S. Cl. .......................... 345/424; 345/419; 345/420
(58) Field of Classification Search ........................ None
See application file for complete search history.

(56) References Cited

U.S. PATENT DOCUMENTS

| | | | | |
|---|---|---|---|---|
| 5,499,323 | A * | 3/1996 | Doi et al. | 345/426 |
| 6,573,893 | B1 * | 6/2003 | Naqvi et al. | 345/424 |
| 6,771,262 | B2 * | 8/2004 | Krishnan | 345/424 |
| 7,085,406 | B2 * | 8/2006 | Alyassin | 382/131 |
| 7,439,974 | B2 * | 10/2008 | Chihoub et al. | 345/422 |
| 7,616,794 | B2 * | 11/2009 | Moeller | 382/128 |
| 2001/0055016 | A1 * | 12/2001 | Krishnan | 345/424 |

OTHER PUBLICATIONS

Sarah F.F. Gibson, et al., A Survey of Deformable Modeling in Computer Graphics, Mitsubishi Electric Info. Tech. Center America, 1997, 201 Broadway, Cambridge, MA 02139.

Tim McInerney, et al., Deformable Models in Medical Image Analysis: A Survey, Published in Medical Image Analysis, 1(2):91-108, 1996.

Jayaram K. Udupa, et al., Shell Rendering, IEEE Computer Graphics & Applications, 0272-17-16/93/1100-0058$03.00© 1993 IEEE, Nov. 1993.

Elizabeth Bullitt, et al., Volume rendering of segmented image objects, Medical Imaging, IEEE Transactions, Publication Date: Aug. 2002, vol. 21, Issue 8, pp. 998-1002.

Bernhard Petersch, et al., Real Time Computation and Temporal Coherence of Opacity Transfer Functions for Direct Volume Rendering of Ultrasound Data, Advanced Computer Vision Gmb (ACV), 46 pgs.

Vladimir Zagrodsky, et al., Volume Rendering of Real-Time 3D Echocardiograhic Data, Proceedings of the IEEE Visualization Oct. 23-28, 2005, Minneapolis, MN, USA (VIS'05), 2 pgs.

Dieter Honigmann, et al., Adaptive Design of a Global Opacity Transfer Function for Direct Volume Rendering of Ultrasound Data, IEEE Visualization 2003, Oct. 19-24, 2003, Seattle, Washington, USA, 0-7803-8120-3/03$17.00 © 2003 IEEE.

* cited by examiner

*Primary Examiner* — Said Broome
(74) *Attorney, Agent, or Firm* — Dean Small; The Small Patent Law Group

(57) ABSTRACT

A method for performing a volume rendering of an image uses a computer having a processor, memory, and a display. The method includes globally segmenting image data that represents an image to thereby locate boundaries in the image, determining regional opacity functions using the image data in a vicinity of the boundaries, and volume rendering the image data utilizing the regional opacity functions to display an image. The method provides a presentation of improved images of structures. These improved images are obtained using a regional optimization of the opacity function such that the perceived object boundary coincides more closely with a segmented boundary.

17 Claims, 14 Drawing Sheets

METHODS AND APPARATUS FOR VOLUME RENDERING

BACKGROUND OF THE INVENTION

This invention relates generally to methods and apparatus for optimizing or at least improving volume renderings in images. The methods and apparatus are particularly useful in medical imaging.

Visualization by volume rendering is a well-known technique to produce realistic images of volumetric objects. One method of producing volume renderings is to cast rays through the volume and record the "ray values" when the rays pass a plane behind the object. The "ray value" recorded in the view plane is a combination of the values of all the voxels along the path from the viewpoint to the view plane. Typically, the combination is the sum of the voxel value, each multiplied by a certain weighting value called "opacity".

Cardiac ultrasound data is of highly varying image quality (IQ). Even in high IQ datasets, there is heterogeneous gray-scale intensity along chamber boundaries. Furthermore, the gray-scale intensity often changes during the cardiac cycle. This makes it very challenging to generate high quality volume renderings. The current solution is to make a "soft" opacity function giving a fuzzy definition of an object boundary. However, what the user then perceives as an inner wall of a chamber might not be the inner wall.

Automated segmentation methods are commonly used when measuring object volumes in volumetric image data. Various types of three-dimensional (3D) segmentation algorithms have been developed. Most algorithms have in common that an elastic model deforms towards edges in the volumetric image data.

Shell rendering is an alternative to traditional ray-casting based volume renderings. Shell renderings overcome storage and speed issues of ray casting techniques. A shell consists of a set of voxels near the object boundary together with a number of attributes associated with the voxels in this shell. If there is low confidence in the object boundaries, voxels far from the actual boundary may also belong to the shell. Increased rendering speed is achieved by projecting only the voxels within the shell on to the view plane (voxel projection). A boundary-likelihood may be assigned to each voxel to allow measurement of distances directly in the volume rendering. As an example of a boundary likelihood function, a normalized magnitude of the image gradient may be used. The choice of the boundary-likelihood function must relate to the opacity to make the rendering relate intuitively to what is being measured.

Methods for combining ray casting with segmentation are also known. The methods utilize an "object mask" file that contains information about to which object each voxel belongs. A "superficial rendering" based on projecting voxels in the object boundary vicinity on to the view plane and a "deep rendering" based on maximum intensity projection of all voxels within the object are both provided. Using this approach, the actual image data is displayed and allows the user to "turn off" any obscuring object. The segmentation boundary also may be dilated so that the surrounding image data can be seen if the segmentation results are in doubt.

A method using a fully automatic endocardial segmentation technique to improve volume renderings of ultrasound data is also known. The technique includes a method of voxel opacity assignment based on the voxel location relative to the segmented endocardium (the Euclidian distance from the segmented boundary modulated the opacity function) and the voxel intensity after applying an anisotropic filter. In this approach, the opacity function is partly controlled by the segmentation. However, the opacity function is not adapted to the intensity of the boundary data.

Methods for global and regional optimization of the opacity function when rendering ultrasound data are also known. In these methods, the projected rays of the volume rendering are analyzed to improve the opacity function. These approaches use a local edge detector and not a global segmentation algorithm in order to estimate the opacity function (s).

The known approaches and techniques do not use the combination of a global segmentation method and regional opacity functions to improve the volume rendering. Accordingly, image quality of the volume rendering may be degraded.

BRIEF DESCRIPTION OF THE INVENTION

In one embodiment of the present invention, a method is provided for performing a volume rendering of an image. The method uses a computer having a processor, memory, and a display. The method includes globally segmenting image data that represents an image to thereby locate boundaries in the image, determining regional opacity functions using the image data in a vicinity of the boundaries, and volume rendering the image data utilizing the regional opacity functions to display an image.

In another embodiment of the present invention, an apparatus for generating a volume rendering of an image is provided. The apparatus includes a computer having a processor, memory, and a display. The apparatus also includes a plurality of modules, including a segmentation module configured to utilize image data of a volume of interest to globally segment the image data, an image statistics extractor module configured to utilize image data and the globally segmented image data to extract regional image statistics, and a volume renderer module configured to utilize the image data and the extracted image statistics to produce regional estimates of opacity functions, and to volume render the image data utilizing the regional opacity functions to display an image.

In yet another embodiment of the present invention a machine readable medium or media is provided having instructions recorded thereon that are configured to instruct a computer having a processor, a display, and memory to globally segment image data that represents an image to thereby locate boundaries in the image, determine regional opacity functions using the image data in a vicinity of the boundaries, and volume render the image data utilizing the regional opacity functions to display an image.

Embodiments of the present invention provide a presentation of improved images of structures. These improved images are obtained using a regional optimization of the opacity function such that the perceived object boundary coincides more closely with a segmented boundary.

DETAILED DESCRIPTION OF THE INVENTION

Figure 1:
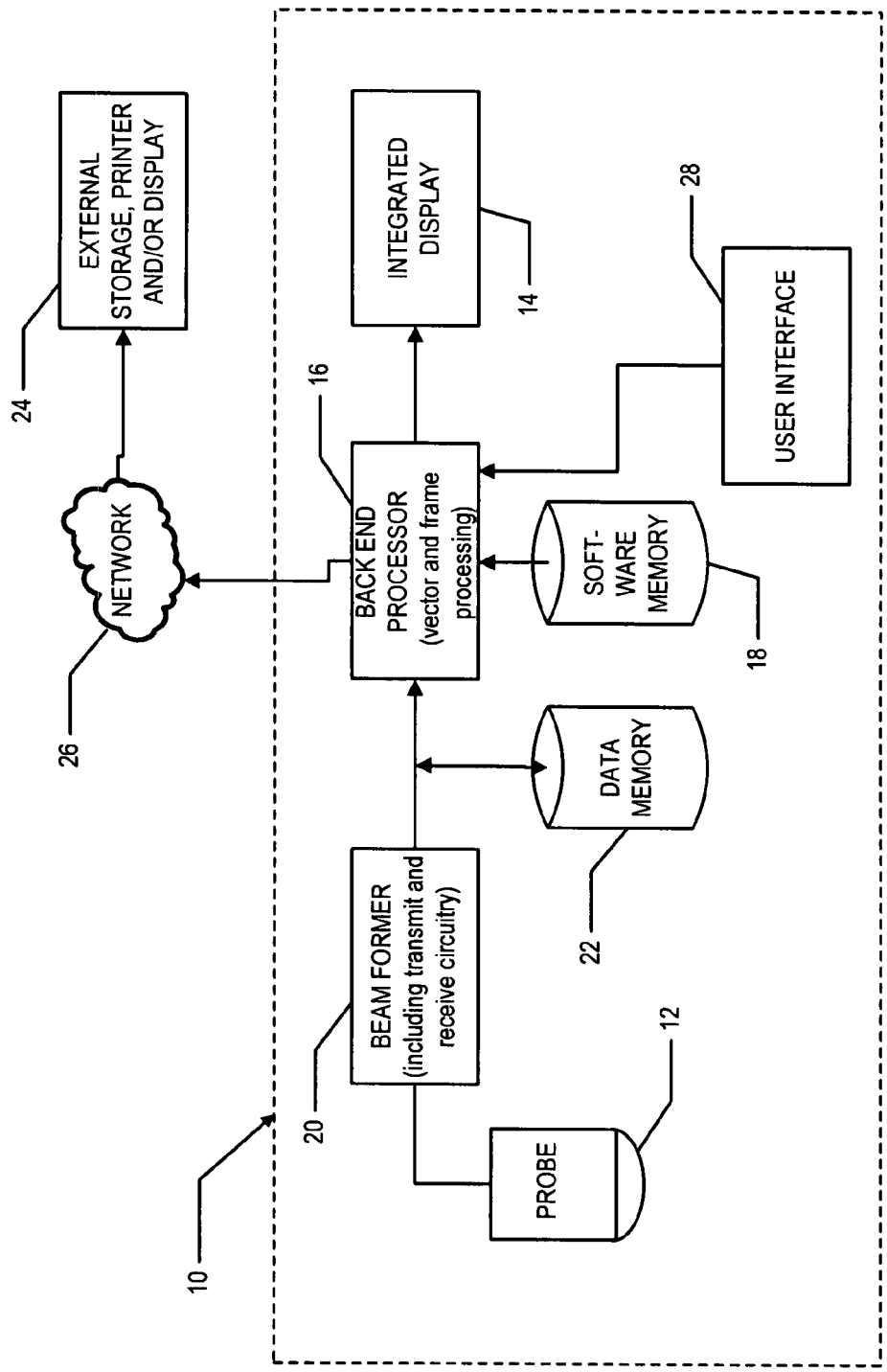
FIG. 1 is a block diagram of an ultrasound imaging apparatus formed in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide a method for volume rendering. It should be noted that finding a good opacity function for rendering imaging data results in a high-quality rendering. The opacity function accordingly should satisfy the following two requirements:

(1) The opacity function has to be correctly localized with respect to the image data. Specifically, if the boundary is associated with some voxel value v, the opacity function should give that voxel maximum opacity.

(2) The opacity for the remaining data values should be assigned in such a way to minimize the creation of misleading artifacts in the rendering.

If an object has already been segmented by an automated segmentation method, the opacity function may be optimized regionally. A regionally optimized or at least regionally improved opacity function is referred to herein as a "regional opacity function."

Furthermore, quite frequently, ultrasound data is hampered by low-level clutter noise within the object cavities. Because volume-rendering techniques are based on ray casting, this low level noise might result in low quality volume renderings where the true boundaries are obscured by noise. If segmentation has been performed before rendering the volume, data outside the object boundary to be visualized may be cropped away. This type of cropping is referred to herein as a "segmentation crop."

Further, some anatomical structures that an operator may want to view are moving during a cardiac cycle (e.g. the mitral valve), making it difficult to make a proper volume rendering of the structure. However, after segmentation, the approximate motion of the structure is known and a dynamic segmentation crop may be applied to the data. Also, all image data that is not a part of the structure to render can be removed. For example, everything outside the mitral annulus may be removed. This type of cropping is referred to herein as a "dynamic segmentation crop."

Technical effects of various embodiments of the present invention include presentation of improved images of structures. This technical effect is achieved by a regional optimization of the opacity function so that the perceived boundary coincides more closely with a segmented boundary.

Several optimization methods for optimizing, or at least improving the opacity function according to various embodiments of the invention include:

1. Adjusting the opacity function so that the function has the correct location with respect to image characteristics (e.g. the gray level) in the neighborhood of the segmented boundary.

2. Adjusting the steepness of the opacity function to fit a confidence measure of a detected boundary.

3. Adjusting the opacity function so that the function has correct location and shape with respect to image statistics of the region inside or outside the object (e.g., mean and standard deviation of the blood pool).

It should be noted that in some volume rendering embodiments, only image data close to the segmented object boundary is used. Further, in some volume rendering embodiments, the cropping surface(s) move, such as during a cardiac cycle. For example, in the case of a mitral valve rendering, the rendering may exclude everything outside the mitral annulus. Also, a soft crop with a fuzzy cropping region may be applied instead of a hard crop with a precise crop border to avoid artifacts in the volume rendering.

FIG. 1 is a block diagram of medical imaging system 10 having a probe or transducer 12 configured to acquire raw medical image data. In some embodiments, probe 12 is an ultrasound transducer and medical imaging system 10 is an ultrasound imaging apparatus. A display 14 (e.g., an internal display) is also provided and is configured to display a medical image. A data memory 22 stores acquired raw image data, which may be processed by a beam former 20 in some embodiments of the present invention.

To display a medical image using probe 12, a back end processor 16 is provided with a software or firmware memory 18 containing instructions to perform frame processing and scan conversion using acquired raw medical image data from probe 12, possibly further processed by beam former 20. Although shown separately in FIG. 1, it is not required that software memory 18 and data memory 22 be physically separate memories. Dedicated hardware may be used instead of software and/or firmware for performing scan conversion, or a combination of dedicated hardware and software, or software in combination with a general purpose processor or a digital signal processor. Once the requirements for such software and/or hardware and/or dedicated hardware are gained from an understanding of the descriptions of embodiments of the invention contained herein, the choice of any particular implementation may be left to a hardware engineer and/or software engineer. However, any dedicated and/or special purpose hardware or special purpose processor is considered subsumed in the block labeled "back end processor 16."

Software or firmware memory 18 can comprise a read only memory (ROM), random access memory (RAM), a miniature hard drive, a flash memory card, or any kind of device (or devices) configured to read instructions from a machine-readable medium or media. The instructions contained in software or firmware memory 18 further include instructions to produce a medical image of suitable resolution for display on display 14 and/or to send acquired raw or scan converted image data stored in a data memory 22 to an external device 24, such as a computer, and other instructions to be described below. The image data may be sent from back end processor 16 to external device 24 via a wired or wireless network 26 (or direct connection, for example, via a serial or parallel cable or USB port) under control of processor 16 and user interface 28. In some embodiments, external device 24 may be a computer or a workstation having a display and memory. User interface 28 (which may also include display 14) also receives data from a user and supplies the data to back end processor 16. In some embodiments, display 14 may include an x-y input, such as a touch-sensitive surface and a stylus (not shown), to facilitate user input of data points and locations.

Figure 2:
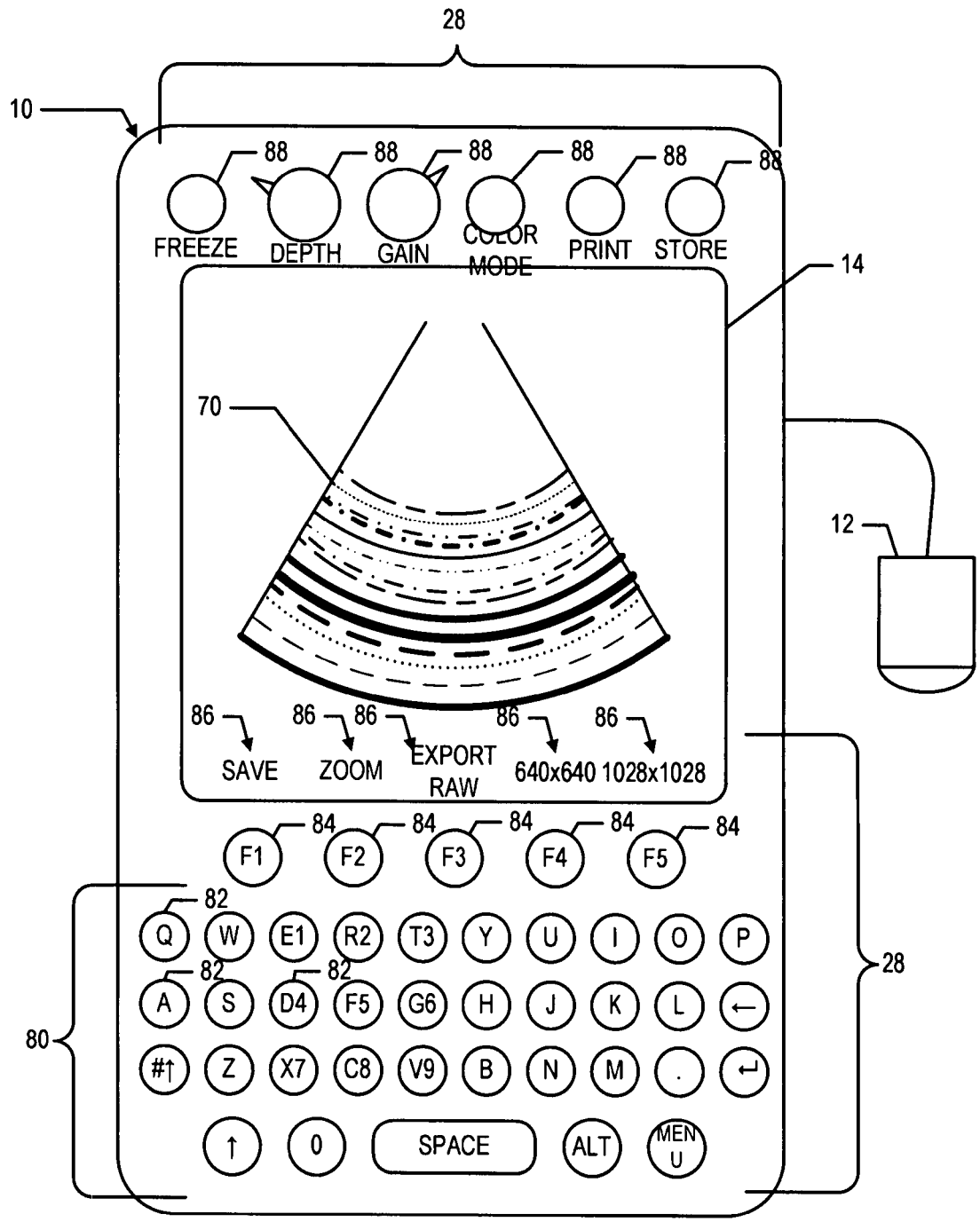
FIG. 2 is a pictorial view of a hand-carried ultrasound imaging apparatus formed in accordance with various embodiments of the invention.

FIG. 2 is a pictorial drawing of an embodiment of medical imaging system 10 configured as a hand-carried device. Hand carried medical imaging device 10 includes display 14, and the user interface 28. In some embodiments of the present invention, a typewriter-like keyboard 80 of buttons 82 is included in user interface 28, as well as one or more soft keys 84 that may be assigned functions in accordance with the mode of operation of medical imaging device 10. A portion of display 14 may be devoted to labels 86 for soft keys 84. For example, the labels shown in FIG. 2 allow a user to save the current raw medical image data, to zoom in on a section of image 70 on display 14, to export raw medical image data to an external device 24 (shown in FIG. 1), or to display (or export) an image. The device may also have additional keys and/or controls 88 for special purpose functions.

Figure 3:
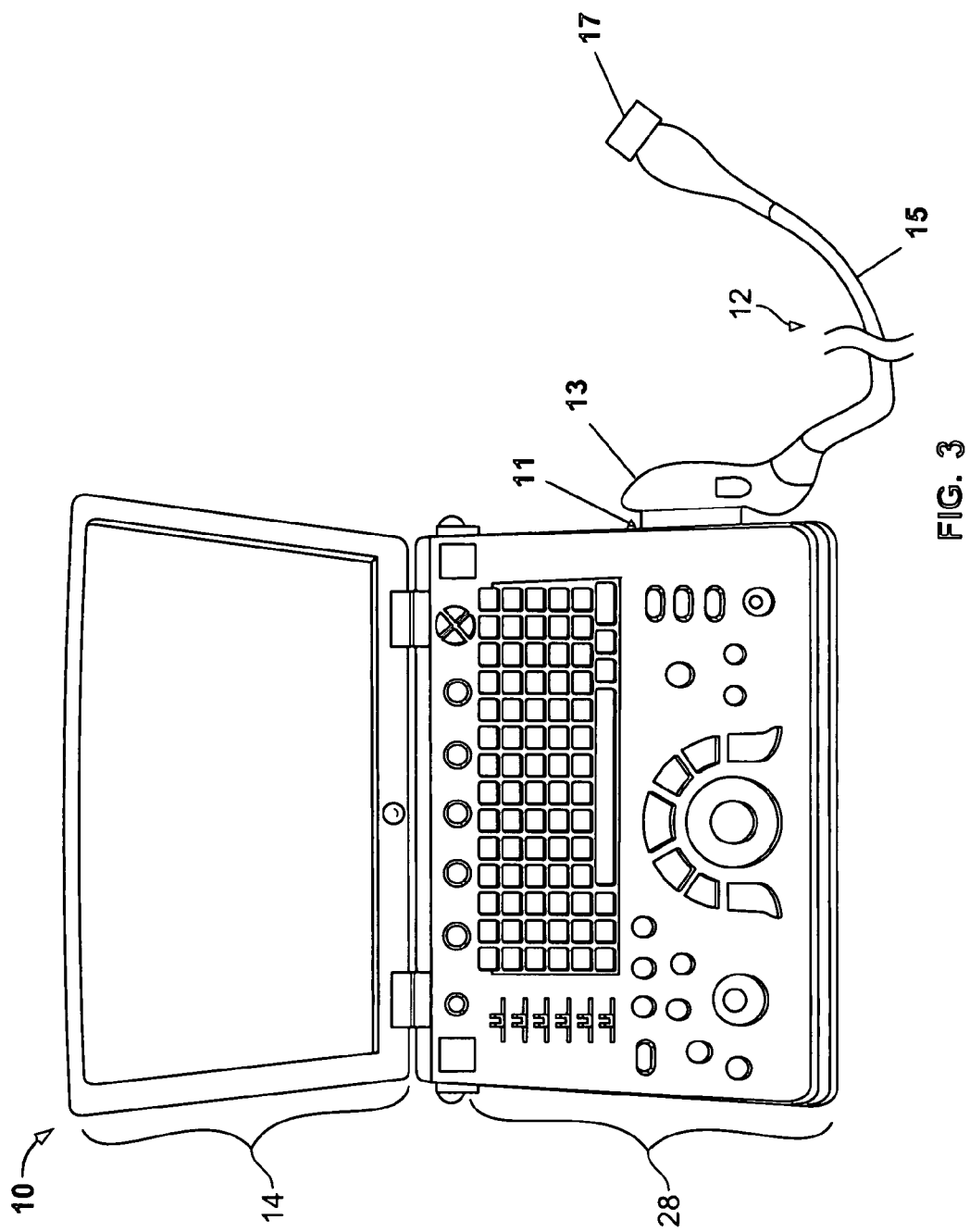
FIG. 3 is a pictorial view of a miniaturized ultrasound imaging apparatus formed in accordance with various embodiments of the invention.

FIG. 3 illustrates an embodiment of medical imaging system 10 configured as a miniaturized device. As used herein, "miniaturized" means that the ultrasound system 10 is a hand-held or hand-carried device or is configured to be carried in a person's hand, briefcase-sized case, or backpack. For example, medical imaging system 10 may be a hand-carried device having a size of a typical laptop computer, for instance, having dimensions of approximately 2.5 inches in depth, approximately 14 inches in width, and approximately 12 inches in height. Medical imaging system 10 may weigh about ten pounds.

An ultrasound probe 12 has a connector end 13 that interfaces with ultrasound system 10 through an I/O port 11 on medical imaging system 10. Probe 12 has a cable 15 that connects connector end 13 and a scanning end 17 that is used to scan a patient. Medical imaging system 10 also includes a display 14 and user interface 28.

Embodiments of the present invention can comprise software or firmware instructing a computer to perform certain actions. Some embodiments of the present invention comprise stand-alone workstation computers that include memory, a display and a processor. The workstation may also include a user input interface (which may include, for example, a mouse, a touch screen and stylus, a keyboard with cursor keys, or combinations thereof). The memory may include, for example, random access memory (RAM), flash memory, read-only memory. For purposes of simplicity, devices that can read and/or write media on which computer programs are recorded are also included within the scope of the term "memory." A non-exhaustive list of media that can be read with such a suitable device includes CDs, CD-RWs, DVDs of all types, magnetic media (including floppy disks, tape, and hard drives), flash memory in the form of sticks, cards, and other forms, ROMs, etc., and combinations thereof.

Some embodiments of the present invention may be incorporated into a medical imaging apparatus, such as ultrasound imaging system 10 of FIG. 1. In correspondence with a stand-alone workstation, the "computer" can be considered as apparatus itself, or at least a portion of the components therein. For example, back end processor 16 may comprise a general purpose processor with memory, or a separate processor and/or memory may be provided. Display 14 corresponds to the display of the workstation, while user interface 28 corresponds to the user interface of the workstation. Whether a stand-alone workstation or an imaging apparatus is used, software and/or firmware (hereinafter referred to generically as "software") can be used to instruct the computer to perform the inventive combination of actions described herein. Portions of the software may have specific functions and these portions are herein referred to as "modules" or "software modules." However, in some embodiments, these modules may comprise one or more electronic hardware components or special-purpose hardware components that may be configured to perform the same purpose as the software module or to aid in the performance of the software module. Thus, a "module" may also refer to hardware or a combination of hardware and software performing a function.

Figure 4:
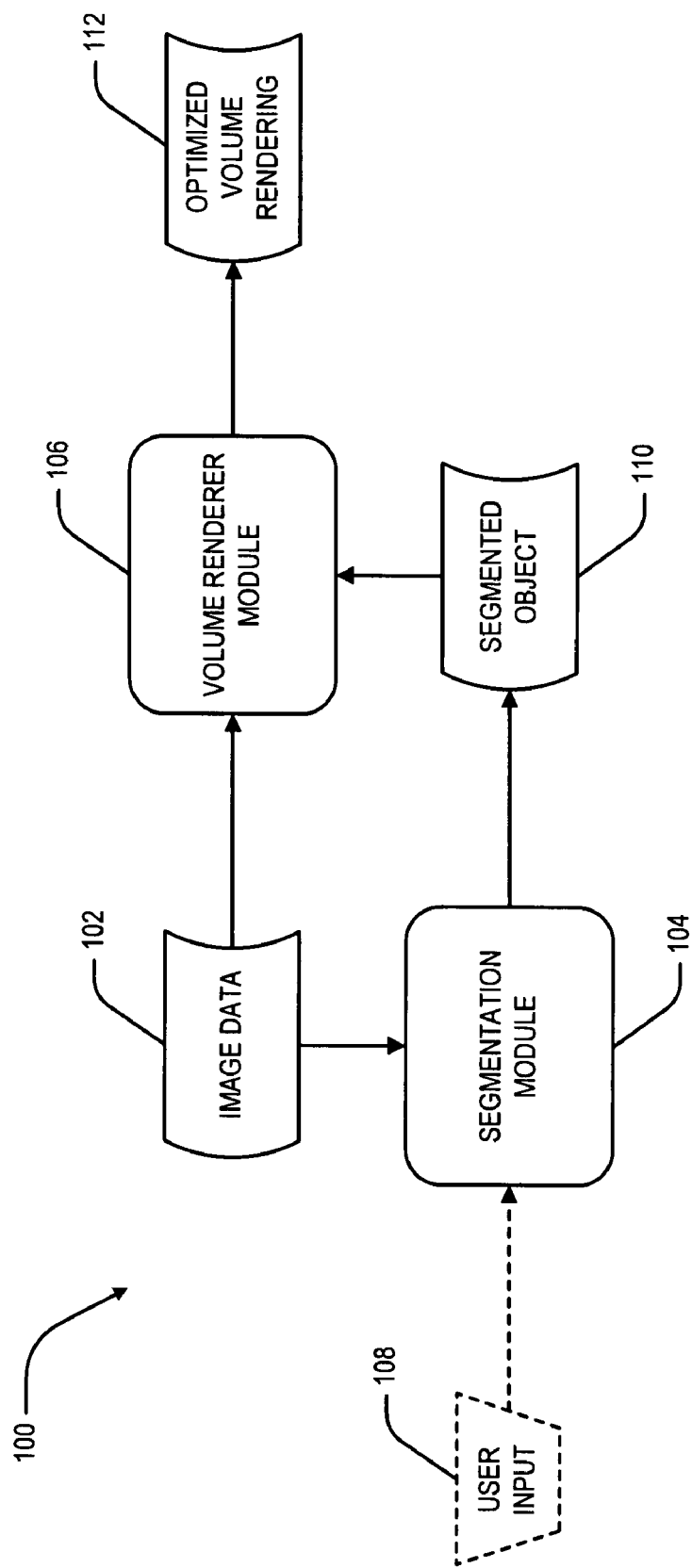
FIG. 4 is a flow chart illustrating data processing in accordance with an embodiment of the present invention.
}

FIG. 4 is a flow chart 100 illustrating data processing in accordance with various embodiments of the invention. Image data 102 (e.g., image data acquired by ultrasound system 10) is provided as input to a segmentation module 104 and a volume rendering module 106. In some embodiments of the present invention, volume rendering module 106 may employ a ray tracing algorithm to construct volume rendering 112. Segmentation module 104 recognizes objects in image data 102 (in some embodiments, with the help of user input 108 to initialize the segmentation algorithm) to produce data representing segmented objects 110. Volume renderer 106 also utilizes different user input 108 to produce an optimized volume rendering 112 (or at least an improved volume rendering, as compared to a volume rendering made without segmented object data 110) on display 14 (shown in FIG. 1). After performing a 4D segmentation of an object, the approximate location of object boundary is known. This information can be utilized to optimize volume renderings of image data, for example, ultrasound data, as described in more detail herein.

Figure 5:
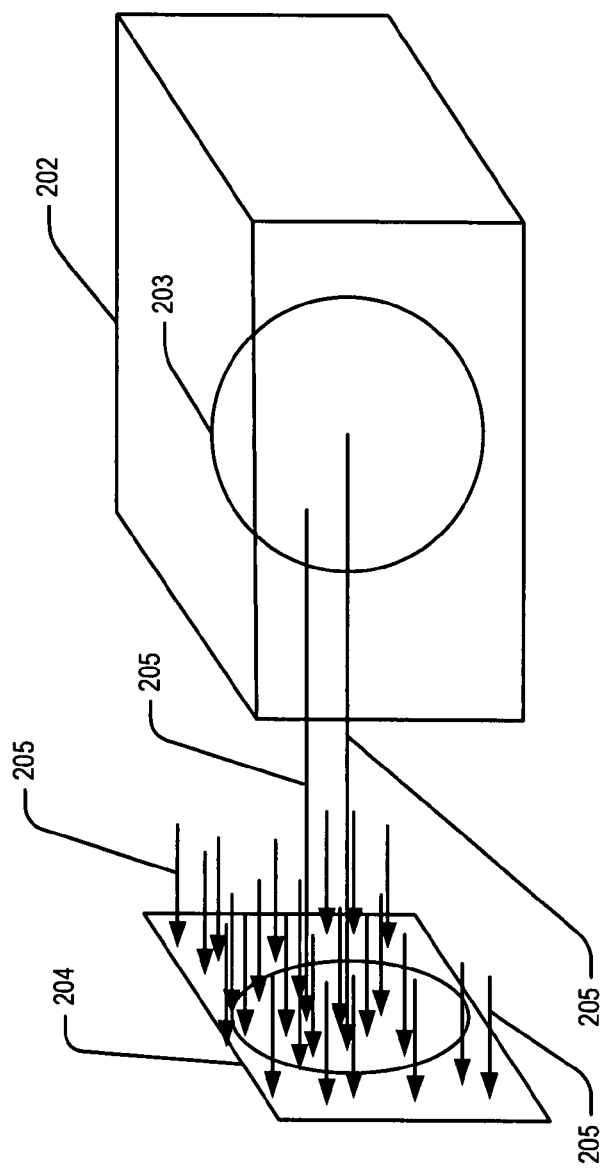
FIG. 5 is a drawing illustrating the prior art technique of visualization by volume rendering.

Visualization by volume rendering is a well-known technique for producing realistic images of volumetric objects 203. As shown in (prior art) FIG. 5, volume rendering may be performed by casting rays 205 through a volume of interest 202. The "ray value" recorded in image plane 204 is a combination of the values of all or some of the voxels met along the path through the volume of interest 202 to the image plane 204, thus the name "volume rendering." In various embodiments of the present invention, the combination is the sum of the voxel values each multiplied by a weighting factor called the "opacity function" or, more generally, a "transfer function." Further, other volume rendering techniques, such as object order rendering (projection of planes or voxels in the dataset into the view plane) may be used instead of ray tracing.

Figure 6:
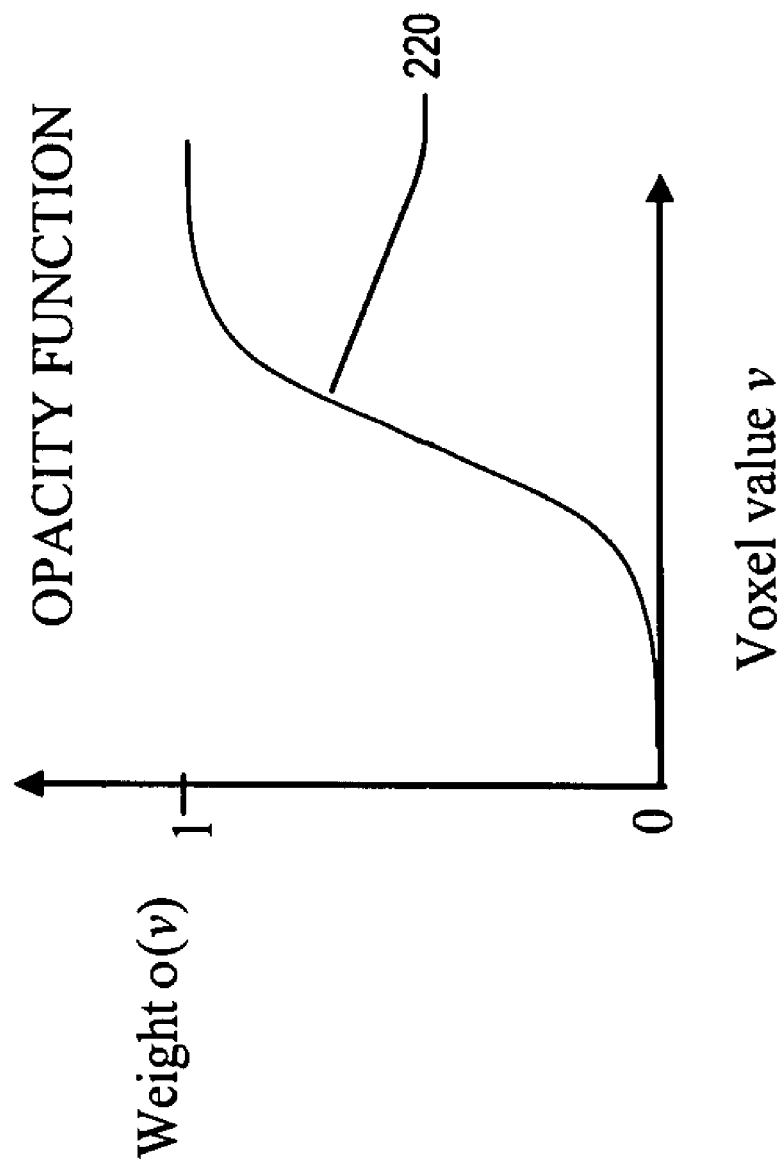
FIG. 6 is a graph of an exemplary opacity function.

One technique for generating a volume rendering in such a way is to accumulate intensity values $v_{acc}$ along the ray (from front to the back through a volume of interest) by applying a recursive formula:

$$v_{acc} = v_{acc} + v \cdot o(v) \cdot o_{acc}$$

where v is the voxel value on the ray, o(.) is a chosen opacity function, such as the opacity function o(.) 220 shown in FIG. 6, and $o_{acc}$ is the accumulated opacity:

$$o_{acc} = o_{acc} \cdot (1 - o(v))$$

The resulting volume rendering depends on the characteristics of the image data and the choice of opacity function.

Figure 7:
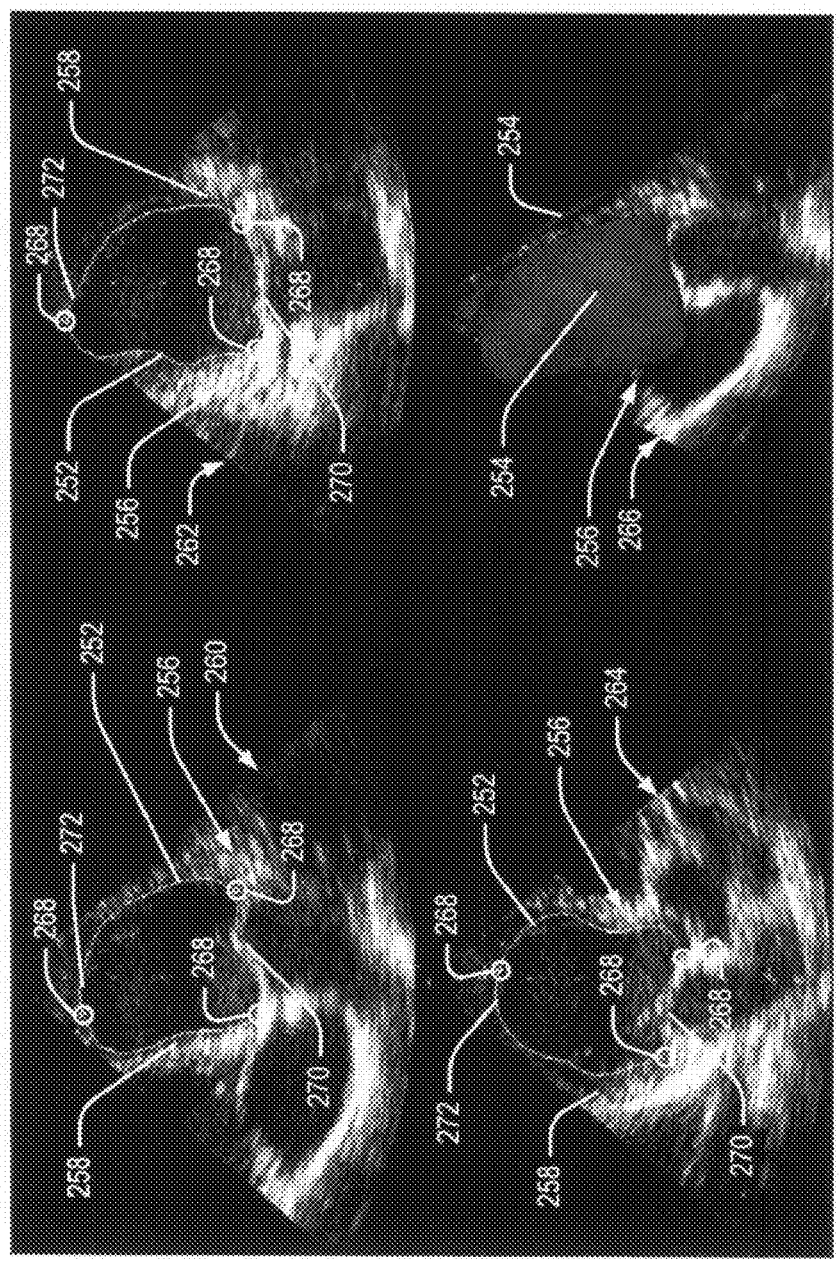
FIG. 7 is a drawing illustrating boundaries and a surface model output by a 3D segmentation algorithm that is configured to detect the boundary of a volumetric object in accordance with various embodiments of the invention.

FIG. 7 is a drawing illustrating boundaries and a surface model output by a 3D segmentation algorithm that is configured to detect the boundary of a volumetric object. In the examples used herein, the images are echocardiographic images (i.e., ultrasound images of a heart) and the volumetric object is the left ventricle, however, the various embodiments are not limited to producing such images. Some embodiments of the invention either provide or require as a prerequisite, a segmentation algorithm for volumetric image data. FIG. 7 illustrates the segmentation of boundaries 252 and a surface model 254 in a volumetric object 256. The segmentation algorithm detects inner boundaries 258 of volumetric object 256. In the example represented in FIG. 7, volumetric object 256 is a human heart, and inner boundaries 258 are the walls of the left ventricle of the heart. Most segmentation algorithms have in common that boundaries 252 of an elastic model deform towards edges 258 in volumetric data. The various embodiments segment the volumetric object 256 within the volumetric data. In some embodiments, volumetric object 256 together with slices 260, 262, 264, and 266 of the image data are then displayed by a renderer in a segmentation screen, such as on display 14 of FIG. 1. Small circles 268 in FIG. 7 shown around a valve 270 and also at an apex 272 at the upper part of each image slice 260, 262, and 264 represent an initial guess or estimate for the segmentation algorithm.

Figure 8:
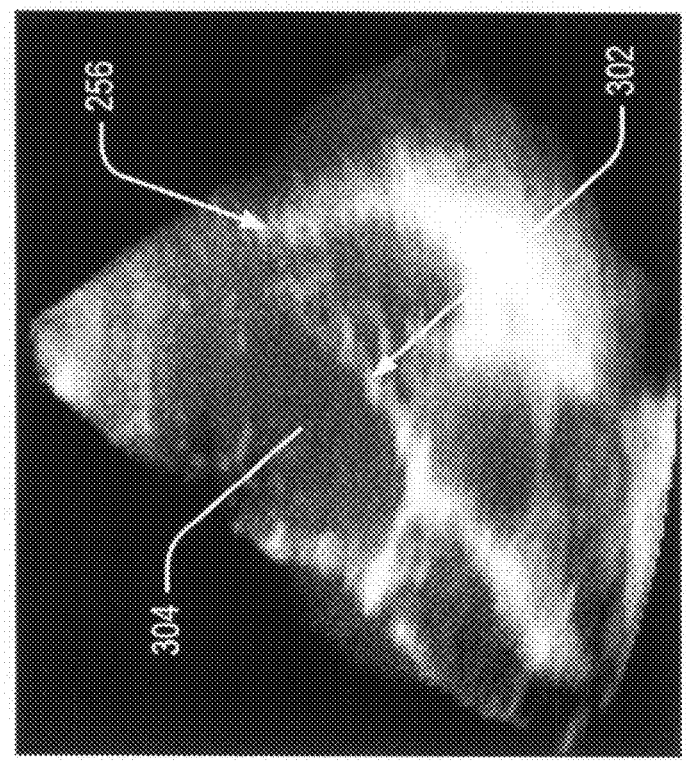
FIG. 8 is a drawing of a volume rendered image of a heart wherein the image is degraded by data having a considerable amount of noise within a cavity of a chamber.

FIG. 8 shows a volume rendered image of a heart 256 that is degraded by data having noise within a cavity 300 of a chamber 302, making the image foggy. Embodiments of the invention reduce or eliminate this noise automatically after a segmentation has been performed by adjusting the transfer/opacity function shown in FIG. 6. The segmentation shown in FIG. 7 can be used to optimize or improve the opacity function shown in FIG. 6.

Figure 9:
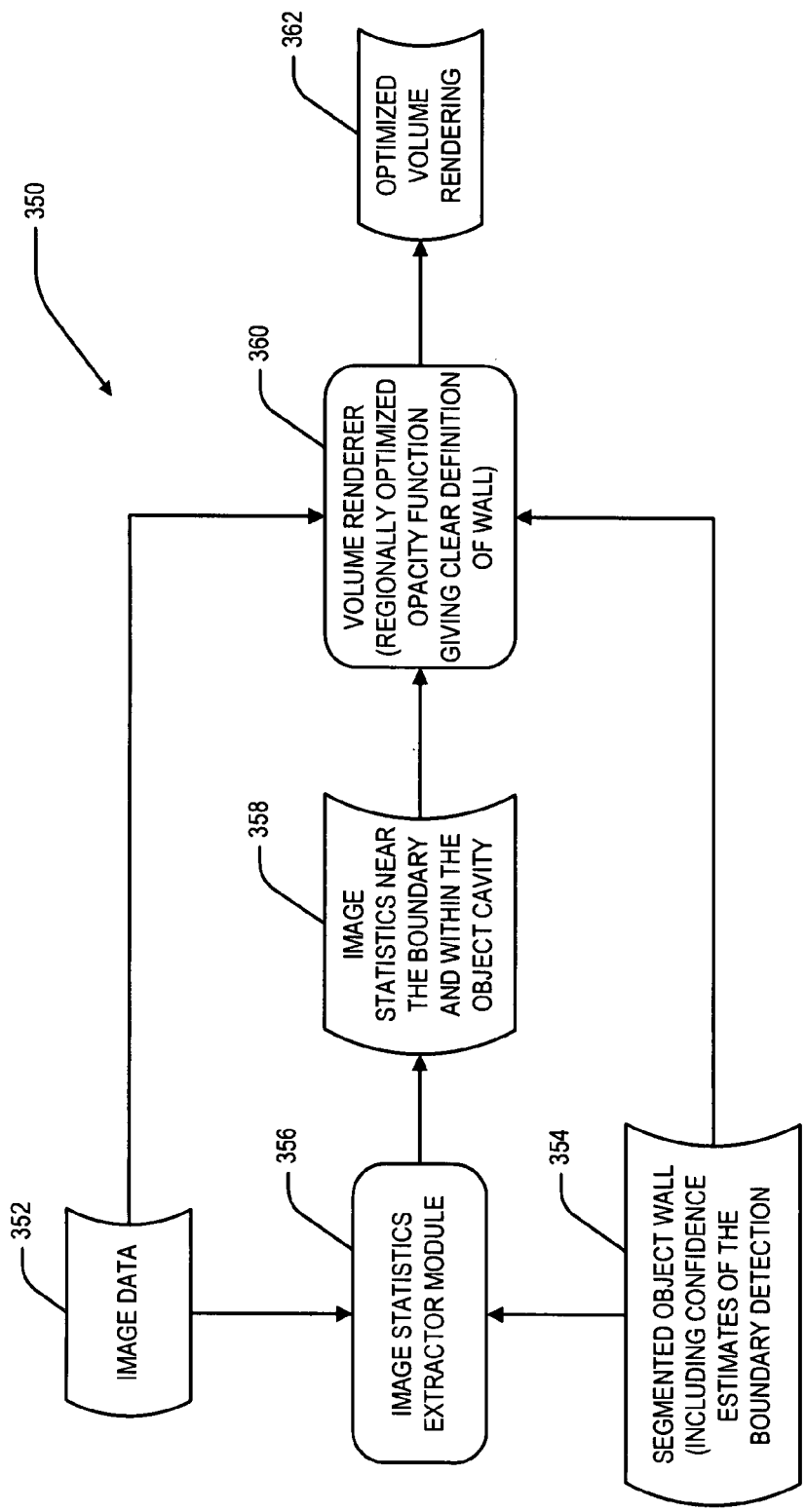
FIG. 9 is a flow chart of an exemplary process used in some embodiments of the invention.

Given image data and a segmentation, some embodiments of the present invention analyze the image in the vicinity of a boundary. FIG. 9 is a flow chart 350 of a process used in some embodiments of the invention. Image data 352 and segmented object boundary data 354 are provided to an image statistics extractor module 356. Many segmentation algorithms also output a regional confidence estimate of the boundary detection. This confidence estimate may be used to model the shape of the opacity function. For example, as discussed below, a contrast measurement across an object boundary and/or overall gray level may be used to determine a confidence estimate for a set of locations on the segmented boundary. Image statistics extractor module 356 extracts regional image statistics 358 in the vicinity of the segmented boundary and/or within or outside the object boundary. Statistics 358 are used along with image data 352 and segmented object data 354 by a volume renderer module 360 that produces an optimized (or at least improved) volume rendering 362 by adjusting opacity function o(.). The improvement of volume rendering 362 is relative to a volume rendering made with an opacity function determined without regard to the image statistics.

Figure 10:
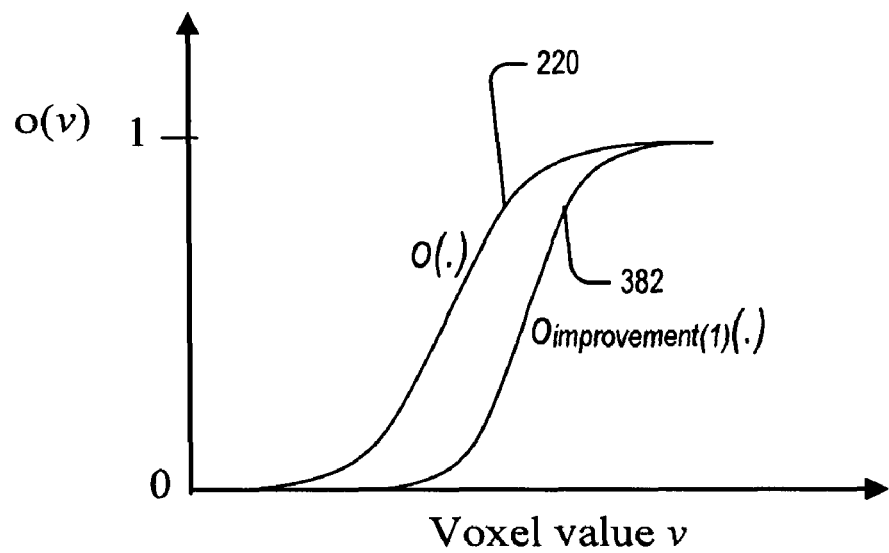
FIG. 10 is a graph comparing an original opacity function to an opacity function improved by adjusting the lateral location and the steepness of the opacity function.
Figure 11:
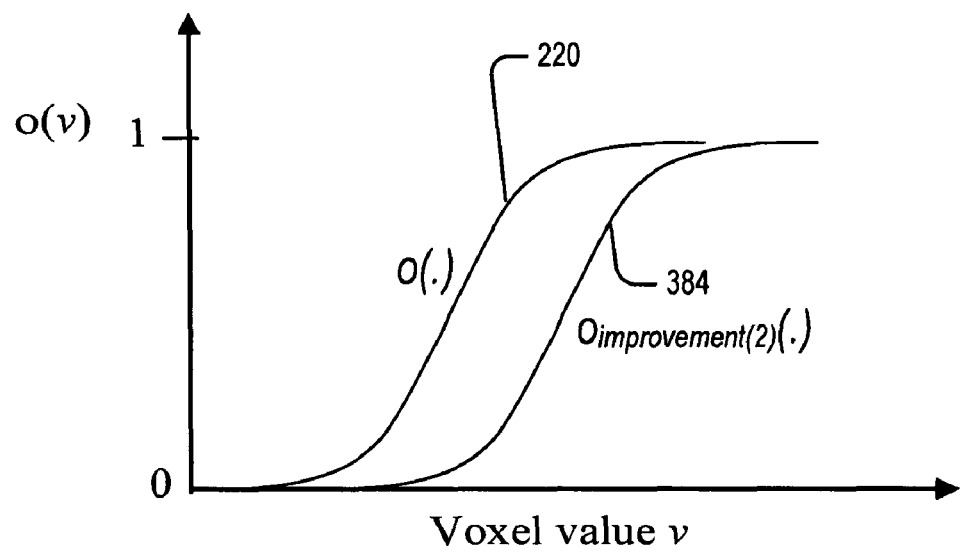
FIG. 11 is a graph of an opacity function adapted to the image statistics of an object cavity (the inside of a segmentation) with the location of the original opacity function is translated in accordance with various embodiments of the invention.

For example, the gray level and the contrast in the vicinity of the object boundary allow these embodiments to adjust the opacity function, as shown in FIGS. 10 and 11. In FIG. 10, the opacity function 220 (o(.)) of FIG. 6 is adjusted to a new opacity function 382 ($o_{improvement(1)}(.)$). This adjustment is performed automatically, after the segmentation is performed. In the case of FIG. 10, image characteristics at the boundary may control the lateral location of the opacity function. Thus, compared to opacity function o(.) 220 of FIG. 6, opacity function $o_{improvement(1)}(.)$ 382 of FIG. 10 favors boundaries at higher intensity levels. The steeper transition zone of $o_{improvement(1)}(.)$ 382 of FIG. 10 indicates that the system has high confidence in the segmented boundary in this region.

FIG. 11 is another example of an opacity function adapted to the image statistics of the object cavity (the inside of the segmentation). From a segmentation model, image statistics (mean and standard deviation) may be obtained in the region inside the object (e.g., a blood pool). These image statistics can be used for controlling the location and the shape of the left tail of the opacity function. In FIG. 11, the opacity function o(.) 220 of FIG. 6 is adjusted to a new opacity function $o_{improvement(2)}(.)$ 384. This adjustment is performed automatically, after the segmentation is performed. Compared to opacity function o(.) 220, opacity function $o_{improvement(2)}(.)$ 384 is adapted to an object cavity with higher mean intensity.

Figure 12:
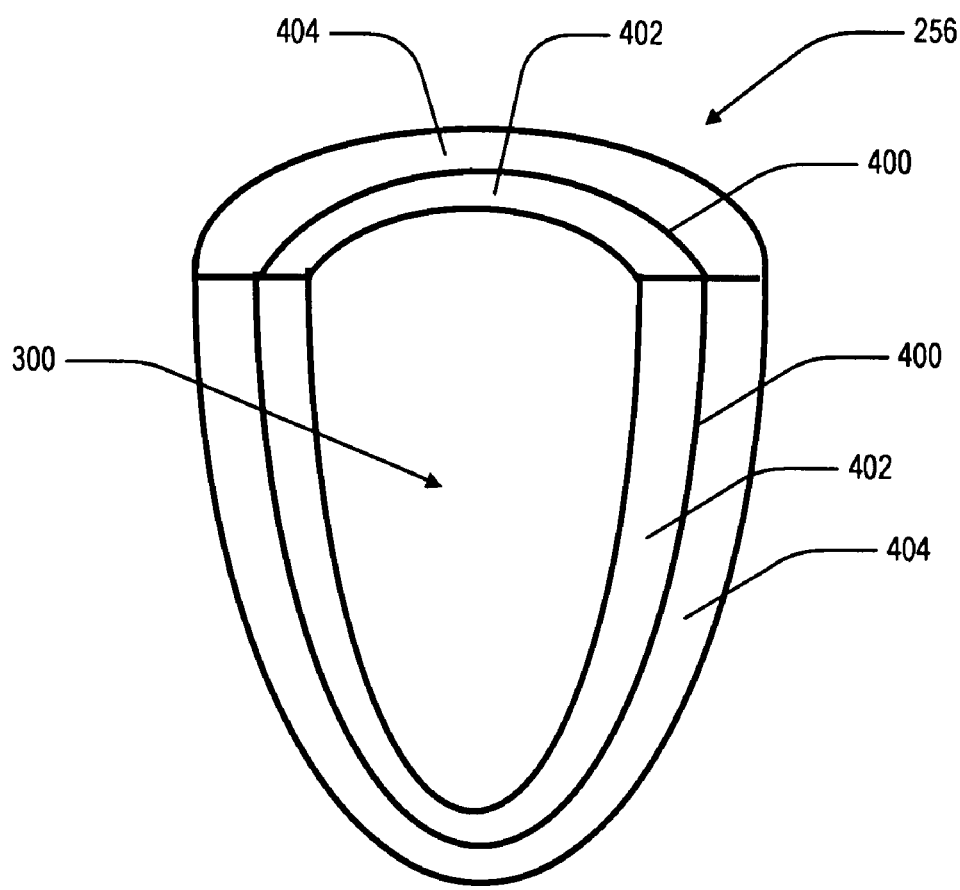
FIG. 12 is a schematic drawing of a segmented object boundary of a cavity showing image data regions on either side of the boundary.

Some embodiments of the present invention may not perform the adjustment of the opacity function automatically and instead, require an operator to push a button. The adjustment can be performed rapidly, resulting in an improved or optimized volume rendering. However, with a real-time segmentation technique, the adjustments of the opacity functions can even be applied during live scanning without any user interaction FIG. 12 is a schematic drawing of a segmented object 256 representing a object boundary 400 showing image data regions 402, 404 on either side of boundary 400. To provide a segmentation crop, volume renderer module 360 operates only on data close to the segmented object boundary, which, in this example, includes data regions 402 and 404.

Figure 13:
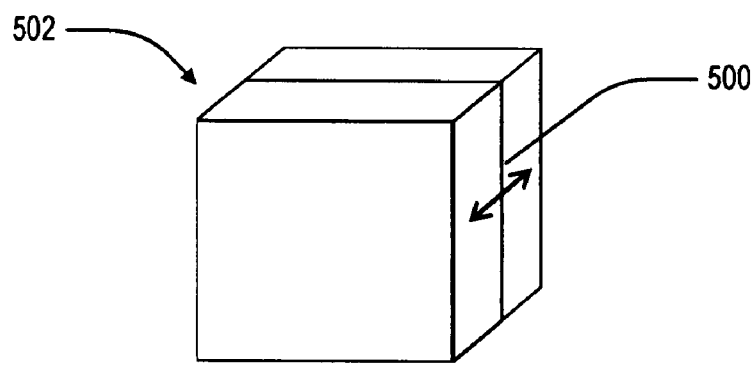
FIG. 13 is a drawing of a representation of a dynamic segmentation crop plane within a volume in accordance with various embodiments of the invention.

FIG. 13 is a representation of a dynamic segmentation crop surface 500 within a volume 502. By using a segmentation to dynamically move cropping surface 500, an operator can concentrate on a single object, for example, a mitral valve. If this cropping is performed by moving the cropping surface so that the cropping stays a little above (or below) the mitral valve during the cardiac cycle, the volume rendering of the mitral valve is significantly improved.

Figure 14:
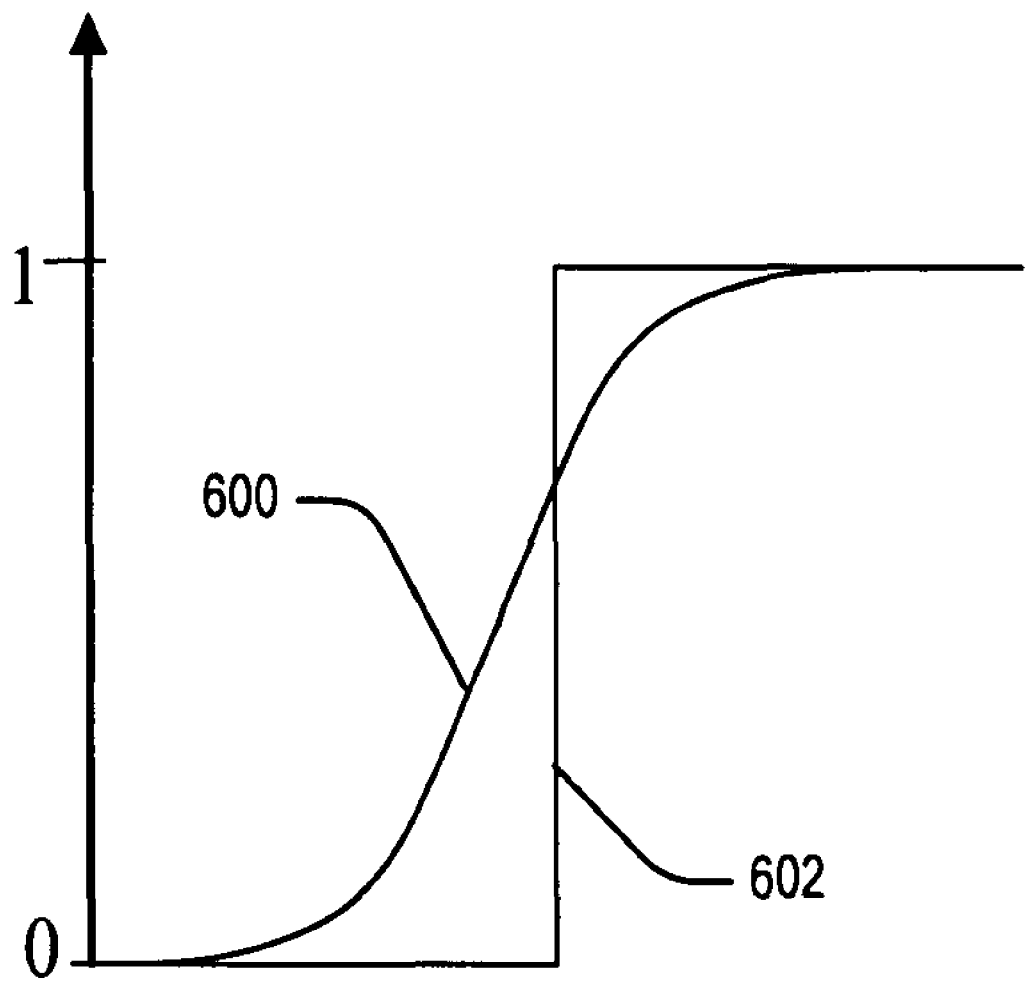
FIG. 14 is a drawing of a representation of a soft crop weighting function that avoids artifacts in a volume renderer module in accordance with various embodiments of the invention.

FIG. 14 is a representation of a soft crop weighting function 600 that avoids artifacts in a volume renderer module 360. In at least one known crop operation, a hard crop weighting function 602 causes image data to be either included or excluded from a volume rendering, thereby giving a precise crop border. In a soft crop, there is a fuzzy crop region. Within the fuzzy crop region, the data is weighted according to the distance from the precise crop border, as indicated by soft crop weighting function 600. For example, soft crop weighting function 600 can be a sigmoid as shown in FIG. 14.

Figure 15:
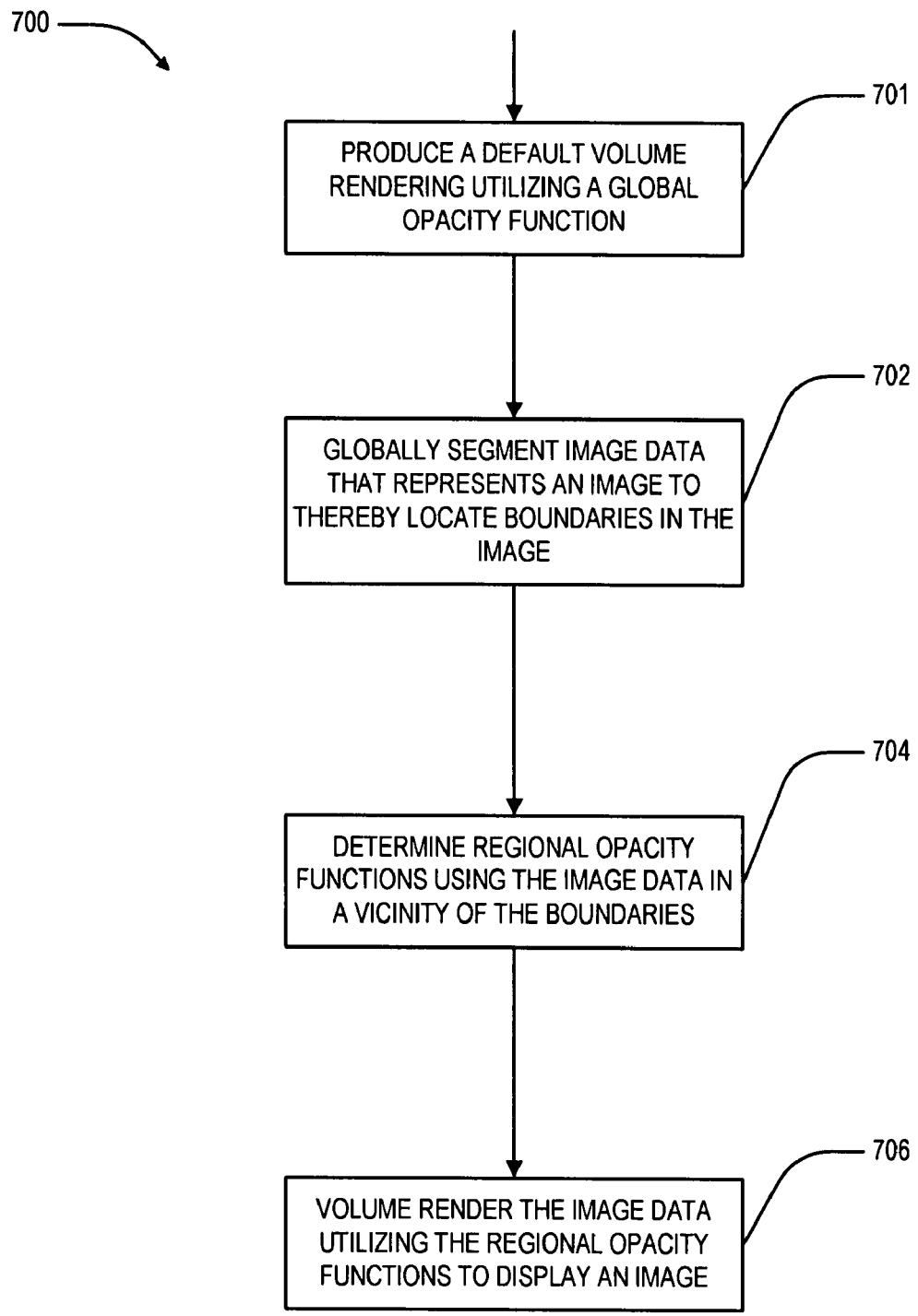
FIG. 15 is a flow chart of a method of volume rendering in accordance with various embodiments of the invention that can be performed on a computer.

Thus, some embodiments of the invention provide a method for improving a volume rendering of an image 362 utilizing a computer having a processor 16, memory 22, and a display 14. FIG. 15 is a flow chart 700 of a method for volume rendering in accordance with various embodiments that can be performed on such a computer. The method includes at 702, globally segmenting image data that represents an image, to thereby locate boundaries in the image. The method further includes, at 704, determining regional opacity functions using the image data in a vicinity of the boundaries. The determination of the regional opacity functions at 704 can include, in some embodiments, utilizing confidence estimates of the boundaries of the segmentation object determined at 702. The method also includes, at 706, volume rendering the image data utilizing the regional opacity functions to display an image. In some configurations, the method further includes, at 701, producing a default volume rendering utilizing a global opacity function prior to globally segmenting the image data at 702.

Figure 16:
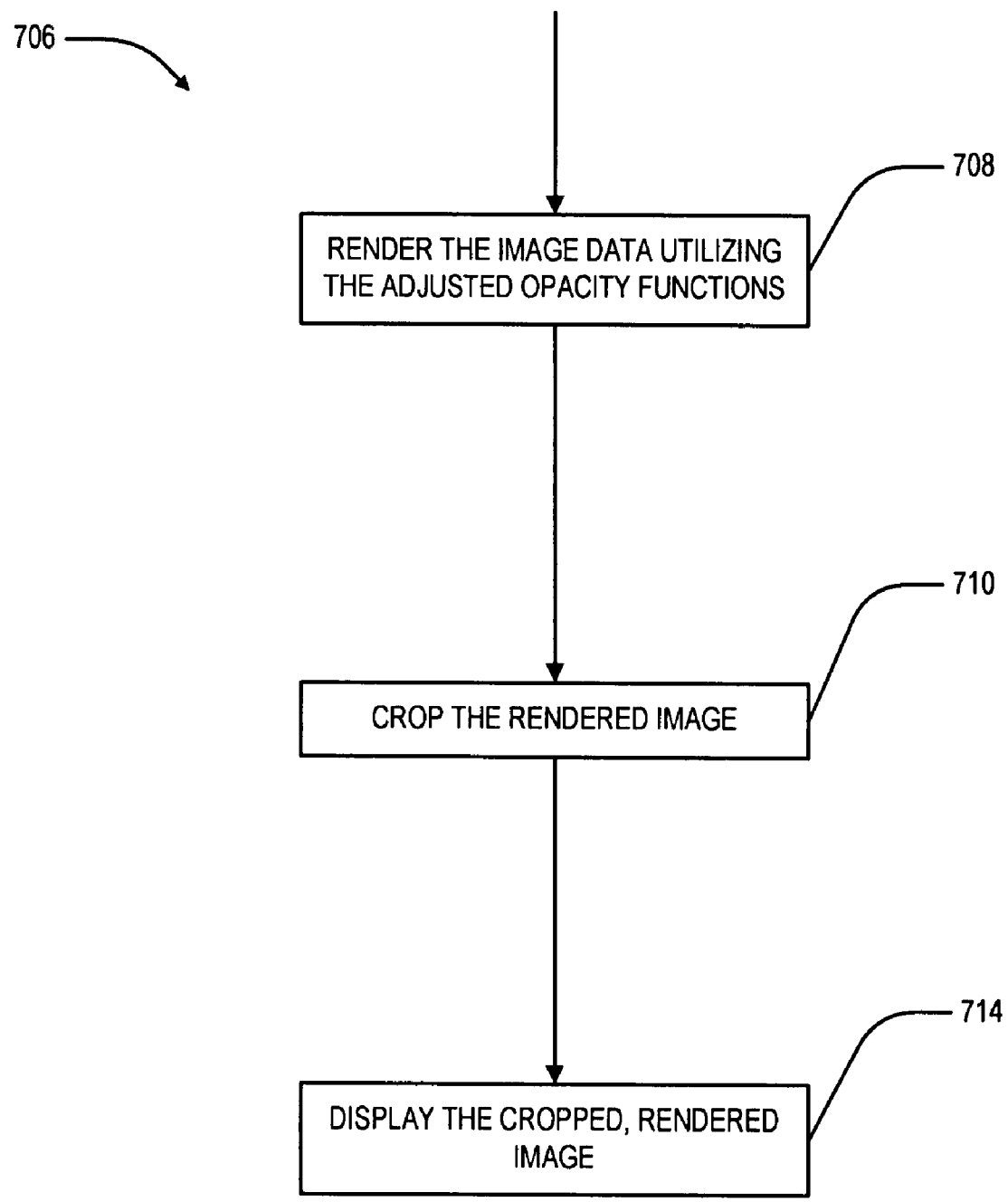
FIG. 16 is a flow chart illustrating a rendering function of FIG. 15 as performed in some embodiments of the invention.

In some method embodiments of the present invention, block 706 also performs one or more cropping functions. FIG. 16 is a flow chart showing more details of block 706 as practiced in these embodiments. In particular, in these embodiments, volume rendering the image data utilizing the adjusted opacity functions occurs at 708. Next, at 710, a crop is performed in some embodiments. The crop at 710 may be either a segmentation crop or a dynamic segmentation crop. In 710, a soft crop weighting function may be applied to the image data to avoid rendering artifacts before displaying the cropped, rendered image at 714. Configurations of the present invention may provide some, all, or none of the cropping facilities indicated by block 710.

It will thus be appreciated that embodiments of the invention provide a presentation of improved images of structures. These improved images are obtained using a regional optimization of the opacity function such that the perceived object boundary coincides more closely with a segmented boundary.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method for performing a volume rendering of an image utilizing a computer having a processor, memory, and a display, said method comprising:
   globally segmenting image data that represents an image acquired by an imaging apparatus casting rays through a volume of interest, to thereby locate one or more boundaries in the image based on voxel intensity values accumulated along the rays;
   determining, using the computer, a regional opacity function using the image data in a vicinity of the boundaries, the regional opacity function based on the voxel intensity values at least one of the vicinity of the boundaries or at the boundaries;
   volume rendering the image data utilizing the regional opacity functions to modify the image, wherein the regional opacity function is used to weigh the voxel intensity values associated with one or more of the vicinity of the boundaries or the boundaries; and
   producing a default volume rendering using a global opacity function that is applied to the voxel intensity values prior to said globally segmenting the image data, wherein the voxel intensity values are weighted based on the global opacity function.

2. A method in accordance with claim 1 wherein said determining comprises utilizing one or more confidence estimates of the boundaries of a segmentation object in the volume of interest, the confidence estimates based on one or more contrast measurements across the one or more boundaries in a direction that is transverse to directions in which the imaging apparatus cast rays through the volume of interest.

3. A method in accordance with claim 1 further comprising performing at least one of a segmentation crop or a dynamic segmentation crop before displaying the image.

4. A method in accordance with claim 3 further comprising applying a soft crop weighting function to the voxel intensity values of at least one of the boundaries or the vicinity of the boundaries before displaying the image, the soft crop weighting function weighing the voxel intensity values based on distances of the voxel intensity values from one or more of the boundaries.

5. A method in accordance with claim 1 further comprising acquiring the image data utilizing an ultrasound imaging apparatus.

6. An apparatus for providing volume rendering of an image, said apparatus comprising a computer having a processor, memory, a display, and modules including non-transitory computer-readable media encoded with a computer program configured to instruct the computer, the modules including:
   a segmentation module configured to instruct the computer to utilize image data of a volume of interest to globally segment the image data, the image data based on voxel intensity values obtained by casting rays through the volume of interest, the segmentation module locating one or more boundaries of the volume of interest in an image;
   an image statistics extractor module configured to instruct the computer to extract regional image statistics of the voxel intensity values at least one of a vicinity of one or more of the boundaries or the boundaries; and a volume renderer module configured to instruct the computer to produce regional estimates of opacity functions based on the image data and the regional image statistics the volume renderer module configured to instruct the computer to modify the image by weighing the voxel intensity values associated with one or more of the vicinity of the boundaries or the boundaries based on the regional estimates of opacity, wherein the regional estimates of opacity functions represent relationships between a weighing factor and the voxel intensity value and the image statistics extractor module is configured to change at least one of a shape or a location of the relationship relative to the voxel intensity values based on image statistics measured from the voxel intensity values located at the boundaries in the image.

7. An apparatus in accordance with claim 6 wherein the segmentation module is further configured to produce a default volume rendering using a global opacity function that is applied to the voxel intensity values prior to globally segmenting the image data, wherein the voxel intensity values are weighted based on the global opacity function.

8. An apparatus in accordance with claim 6 wherein said volume renderer module is further configured to perform at least one of a segmentation crop or a dynamic segmentation crop before displaying the image.

9. An apparatus in accordance with claim 6 wherein the volume renderer module is further configured to utilize a soft crop weighting function to the voxel intensity values of at least one of the boundaries or the vicinity of the boundaries before displaying the image, the soft crop weighting function weighing the voxel intensity values based on distances of the voxel intensity values from one or more of the boundaries.

10. An apparatus in accordance with claim 6 wherein the apparatus is an ultrasound imaging apparatus having an ultrasound transducer.

11. An apparatus in accordance with claim 10 wherein the ultrasound imaging apparatus is configured as a hand-held ultrasound imaging apparatus.

12. A non-transitory machine readable medium or media having instructions recorded thereon that are configured to instruct a computer having a processor, a display, and memory to:
 globally segment image data that represents an image acquired by an imaging apparatus casting rays through a volume of interest, to thereby locate one or more boundaries in the image based on voxel intensity values accumulated along the rays;
 determine a regional opacity function using the image data in a vicinity of the boundaries, the regional opacity function based on the voxel intensity values at least one of the vicinity of the boundaries or the boundaries;
 volume render the image data utilizing the regional opacity function to modify the image by weighing the voxel intensity values associated with one or more of the vicinity of the boundaries or the boundaries based on the regional opacity function; and
 produce a default volume rendering using a global opacity function that is applied to the voxel intensity values prior to said globally segmenting the image data, wherein the voxel intensity values are weighted based on the global opacity function.

13. A non-transitory machine readable medium or media in accordance with claim 12 further having instructions recorded thereon that are configured to instruct the computer to perform at least one of a segmentation crop, a dynamic segmentation crop, or a soft crop of the image data.

14. A method in accordance with claim 1 wherein the regional opacity function is a smooth, non-binary curve.

15. A method in accordance with claim 1 wherein the regional opacity function represents a relationship between a weighing factor and the voxel intensity value, further comprising changing at least one of a shape or a location of the relationship relative to the voxel intensity values based on image statistics measured from the voxel intensity values located at the boundaries in the image.

16. A method in accordance with claim 4 wherein the soft crop weighting function weighs the voxel intensity values based on the distances of the voxel intensity values from one or more of the boundaries that are oriented in transverse directions relative to directions in which the imaging apparatus cast the rays into the volume of interest.

17. An apparatus in accordance with claim 9 wherein the soft crop weighting function weighs the voxel intensity values based on the distances of the voxel intensity values from one or more of the boundaries that are oriented in transverse directions relative to directions in which the imaging apparatus cast the rays into the volume of interest.

* * * * *